United States Patent
Lin et al.

(10) Patent No.: US 9,213,138 B2
(45) Date of Patent: Dec. 15, 2015

(54) PACKAGING AN ARCUATE PLANAR LIGHTWAVE CIRCUIT

(71) Applicant: JDS Uniphase Corporation, Milpitas, CA (US)

(72) Inventors: Qingjiu Lin, Shenzhen (CN); Wei Wang, Shenzhen (CN); Zhihua Mai, Shenzhen (CN); Zhongjian Wang, Shenzhen (CN)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/226,578

(22) Filed: Mar. 26, 2014

(65) Prior Publication Data

US 2014/0294347 A1    Oct. 2, 2014

Related U.S. Application Data

(60) Provisional application No. 61/805,415, filed on Mar. 26, 2013.

(51) Int. Cl.
*G02B 6/30* (2006.01)
*G02B 6/26* (2006.01)
(Continued)

(52) U.S. Cl.
CPC .......... *G02B 6/12026* (2013.01); *G02B 6/4239* (2013.01); *G02B 6/0218* (2013.01); *G02B 6/02209* (2013.01); *G02B 6/1203* (2013.01); *G02B 6/12009* (2013.01); *G02B 6/424* (2013.01)

(58) Field of Classification Search
CPC ............. G02B 6/0218; G02B 6/12009; G02B 6/12026; G02B 6/1203; G02B 6/4239; G02B 6/424; G02B 6/02209

USPC .................. 385/14, 37, 49, 57, 88
See application file for complete search history.

(56) References Cited

U.S. PATENT DOCUMENTS

| 5,327,517 A | * | 7/1994 | Yamada et al. ................ 385/137 |
| 5,978,539 A | | 11/1999 | Davies et al. .................. 385/128 |

(Continued)

FOREIGN PATENT DOCUMENTS

| CA | 2492893 C | 7/2010 | ............... G02B 6/12 |
| CN | 100501468 C | 6/2009 | ............... G02B 6/34 |

(Continued)

OTHER PUBLICATIONS

"Packaging of large-scale planar lightwave circuits," by Kato et al, IEEE Transactions on Components, Packaging, and Manufacturing Technology, Part B, vol. 21, No. 2, pp. 121-129, 1998.*

(Continued)

*Primary Examiner* — Robert Tavlykaev
(74) *Attorney, Agent, or Firm* — Harrity & Harrity, LLP

(57) ABSTRACT

A package for an arcuate planar lightwave circuit (PLC) chip includes a heater plate coupled to a base by a thick and soft support layer. The arcuate PLC is attached to the heater plate by soft adhesive. A hard adhesive is applied to a multi-waveguide end of the arcuate PLC, to additionally strengthen the attachment of the arcuate PLC to the heater plate. The structure allows the mechanical stress due to fiber pull/shock/vibration to be dissipated in the support layer without introducing large wavelength shifts in the arcuate PLC. The support layer also serves as a heat insulator, facilitating uniform heating of the arcuate PLC.

20 Claims, 10 Drawing Sheets

(51) Int. Cl.
*G02B 6/42* (2006.01)
*G02B 6/12* (2006.01)
*G02B 6/02* (2006.01)

(56) References Cited

U.S. PATENT DOCUMENTS

| | | | |
|---|---|---|---|
| 6,430,350 B1 * | 8/2002 | Bookbinder et al. | 385/136 |
| 2001/0016093 A1 | 8/2001 | Dawes et al. | 385/14 |
| 2002/0113242 A1 | 8/2002 | Watanabe et al. | 257/82 |
| 2002/0172473 A1 * | 11/2002 | Kerboeuf et al. | 385/88 |
| 2003/0006224 A1 | 1/2003 | Crafts et al. | 219/209 |
| 2003/0127445 A1 * | 7/2003 | Oguma et al. | 219/209 |
| 2003/0174991 A1 | 9/2003 | Bauer et al. | 385/129 |
| 2004/0017971 A1 | 1/2004 | Johannessen | 385/37 |
| 2004/0247258 A1 | 12/2004 | Tsai et al. | 385/92 |
| 2005/0135743 A1 | 6/2005 | Ascanio et al. | 385/37 |
| 2005/0157973 A1 | 7/2005 | Grobnic et al. | 385/14 |
| 2005/0275958 A1 * | 12/2005 | Yoshimoto et al. | 359/819 |
| 2008/0080806 A1 | 4/2008 | Ho et al. | 385/14 |
| 2013/0136390 A9 | 5/2013 | McGinnis | 385/14 |

FOREIGN PATENT DOCUMENTS

| | | | |
|---|---|---|---|
| CN | 102354028 A | 2/2012 | G02B 6/122 |
| CN | 101840030 B | 3/2012 | G02B 6/34 |

OTHER PUBLICATIONS

"A cost-effective solution for packaging the arrayed waveguide grating (AWG) photonic components," by Zhang et al, IEEE Transactions on Components and Packaging Technologies, vol. 28, No. 3, pp. 564-570, 2005.*

"Shore durometer", wikipedia article, available online since at least Nov. 17, 2011.*

"Adhesives in the packaging of planar lightwave circuits" by Xiao et al, International Journal of Adhesion and Adhesives, vol. 24, pp. 313-318, 2004.*

* cited by examiner

PACKAGING AN ARCUATE PLANAR LIGHTWAVE CIRCUIT

CROSS-REFERENCE TO RELATED APPLICATIONS

The present invention claims priority from U.S. Provisional Patent Application No. 61/805,415, filed Mar. 26, 2013, incorporated herein by reference.

TECHNICAL FIELD

The present invention relates to optical components and modules, and in particular to packaging planar lightwave circuits of an arcuate shape.

BACKGROUND OF THE INVENTION

Planar lightwave circuits (PLCs) are used to switch, attenuate, direct, modulate, separate, and combine light at different wavelengths. PLCs include waveguides and couplers formed in semiconductor wafers by photolithography. Advantages of large-scale manufacturability and compactness of PLCs are afforded by the methods borrowed from microelectronics and specifically developed for lightwave circuit applications.

One of most common examples of a PLC is an arrayed waveguide grating (AWG). AWGs are frequently used for wavelength separation and combination. An AWG includes an array of waveguides of incrementally increasing length between input and output slab couplers, to provide wavelength-dependent phase delay resulting in separation of light into individual wavelengths in the output slab coupler. Because the waveguides of the array have incremental lengths, an AWG typically has a bow-like, arcuate shape, with longer waveguides of the array disposed on the convex side of the AWG, and shorter waveguides of the array disposed on the concave side of the AWG.

To fit more bow-like waveguide structures on a single PLC wafer, it has been suggested to dispose individual AWG devices in a plane of the PLC wafer so that a convex side of one AWG borders a concave side of a next AWG. Referring to FIG. 1A, Watanabe et al. in US Patent Application Publication 2002/0113242 teach disposing individual AWGs 102 in two columns side by side on a PLC wafer 101, so that individual AWG chips 107 can be cut out of the PLC wafer 101 by making straight cut lines 103A and arcuate cut lines 103B. The technology for making arcuate wafer cut lines is readily available, e.g. sandblasting or laser machining can be used to cut the PLC wafer 101 along the straight cut lines 103A and arcuate cut lines 103B.

Since wafer processing costs are dominant in PLC production, disposing more AWG chips 107 on the single wafer 101 results in significant economical benefits. Thus, arcuate AWG chips 107 are less expensive to produce than rectangular AWG chips, not shown. The arcuate AWG chips 107 are also easier to heat and keep at a constant temperature, due to reduced thermal mass of arcuate-cut AWG chips as compared to rectangular-cut AWG chips. Despite these advantages, the usage of the arcuate AWG chips 107 has been hitherto hindered by an increased sensitivity of the arcuate AWG chips 107 to mechanical stress. In particular, mechanical stress directed along a line connecting arcuate ends of the arcuate AWG chip 107 (ends of the bow) creates a large optical path length variation in array waveguides of the AWGs 102, due to a photoelastic effect in the waveguides.

To reduce the impact of the mechanical stress, the arcuate AWG chips 107 can be strengthened. Referring to FIG. 1B, Watanabe et al. attached reinforcement beams 151 and 152 to reinforce the arcuate AWG chip 107, to make a reinforced AWG chip 107B. Alternatively, turning to FIG. 1C, Watanabe et al. disclose that an arcuate-cut additional silicon substrate 171 can be attached to the arcuate AWG chip 107, to make a compound arcuate AWG chip 107C. The reinforced arcuate AWG chips 107B and 107C shown in FIGS. 1B and 1C, respectively, are less sensitive to mechanical stress. Detrimentally, attaching additional materials and layers to the arcuate AWG chip 107 is time-consuming and costly. The reinforcing elements have to be matched in their thermal expansion to the AWG chip 107, to prevent bending of the AWG chip 107 out of its plane upon heating or cooling. Furthermore, the reinforced arcuate AWG chips 107B and 107C of FIGS. 1B and 1C, respectively, have a larger mass and thus have a larger thermal inertia, increasing a response time of a temperature stabilization loop.

The effect of optical path length variation due to squeezing or pushing the ends of arcuate AWG is so pronounced that attempts have been made to use this very effect for passive athermalization of AWG chips. For example, Ho et al. in US Patent Application Publication 2008/0080806 disclose an athermalized AWG having a stabilizing post or brace attached to ends of an arcuate AWG chip. The length of the post or brace changes with temperature, creating a temperature-dependent stress on the arcuate AWG chip, which counteracts thermal drift of the arcuate AWG chip. Similar ideas have also been disclosed in Chinese patent applications CN102354028A, CN101840030B, and CN100501468C.

One advantage of passive athermalization is that the temperature stabilization of the AWG chip is not required. Detrimentally however, passively athermalized AWG chips are more difficult to calibrate. Since every AWG has its own thermal drift magnitude, the length of the stabilizing post has to be individually adjusted for each AWG device manufactured, which is time-consuming, tedious, and impeding mass production.

SUMMARY OF THE INVENTION

It is a goal of the invention to provide a simple mechanical packaging structure for an arcuate PLC chip, to lessen a mechanical stress applied to the chip. The inventors have discovered that the most stress is applied when optical fibers connecting to an arcuate PLC chip are pulled upon. In particular, when an output fiber array is pulled, the resulting mechanical stress causes larger wavelength shift than when a single input fiber is pulled. Furthermore, the inventors have discovered that an arcuate-cut PLC chip is so sensitive to mechanical stress that even using grommets to hold a PLC chip—heater assembly in a package, without pulling on any fiber, can cause a severe wavelength shift when the grummets are tightened.

To address stress-related wavelength shift issues, an arcuate PLC chip was epoxied to a heater plate with a soft adhesive. More sensitive multi-fiber end of the PLC chip was also attached to the heater plate with a hard adhesive. The heater plate was then attached to a base with a thick, soft adhesive tape. When the fiber was pulled upon, the stress was absorbed in the tape, the hard adhesive firmly holding the multi-waveguide end of the arcuate PLC chip and the heater together. Surprisingly, this simple structure has resulted in a dramatic reduction of stress-induced wavelength shifts, while allowing easy and efficient temperature stabilization of the entire arcuate-cut PLC chip. The stress-relieving effect was achieved without having to reinforce the arcuate-cut PLC chip with any ribs, arcuate supports, or the like, simplifying overall construction.

In accordance with the invention, there is provided a PLC module comprising:
 a base plate;
 a support layer on the base plate, the support layer having a thickness greater than 1 mm and a hardness of less than 40 Shore A;
 a heater plate on the support layer; and
 a planar lightwave circuit having a shape of an arcuate slab having an input port at its first end and a plurality of output ports at its second, opposed end. The planar lightwave circuit is adhered to the heater over an area spanning between the first and second ends with a first adhesive having a hardness less than 85 Shore A, and proximate the second end with a second adhesive having a hardness of greater than 70 Shore D.

In accordance with the invention, there is further provided an arrayed waveguide grating module comprising:
 a base plate;
 an adhesive tape having a thickness greater than 1 mm and a hardness less than 40 Shore A, adhered to the base plate;
 a ceramic heater plate adhered to the adhesive tape; and
 an arcuate arrayed waveguide chip having an input portion including an input waveguide, an output portion including a plurality of output waveguides, and a central portion therebetween having opposed concave and convex perimeter walls. The input, central, and output portions of the arcuate arrayed waveguide chip are affixed to the ceramic heater plate with a contiguous adhesive layer having a hardness less than 85 Shore A. The output portion of the arcuate arrayed waveguide chip is affixed to the ceramic heater plate with an adhesive having a hardness of at least 70 Shore D.

In accordance with another aspect of the invention, there is further provided a wavelength demultiplexor for demultiplexing a light signal into individual wavelengths, comprising:
 the arrayed waveguide grating module as described above;
 an input port coupled to the input waveguide;
 a plurality of output ports each coupled to a particular one of the plurality of output waveguides; and
 an encasing having the arrayed waveguide grating module affixed therein.

In accordance with yet another aspect of the invention, there is further provided a method of packaging a planar lightwave circuit, the method comprising:
 (a) providing a base plate;
 (b) affixing to the base plate a support layer having a thickness greater than 1 mm and a hardness of less than 40 Shore A;
 (c) providing a ceramic heater plate;
 (d) affixing the ceramic heater plate to the support layer;
 (e) epoxying to the ceramic heater plate a planar lightwave circuit having a shape of an arcuate slab having an input waveguide at its first end, a plurality of output waveguides at its second, opposed end, over an area spanning between the first and second ends with a first epoxy having a hardness less than 85 Shore A; and
 (f) epoxying the second end of the planar lightwave circuit to the ceramic heater plate with a second epoxy having a hardness of greater than 70 Shore D.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
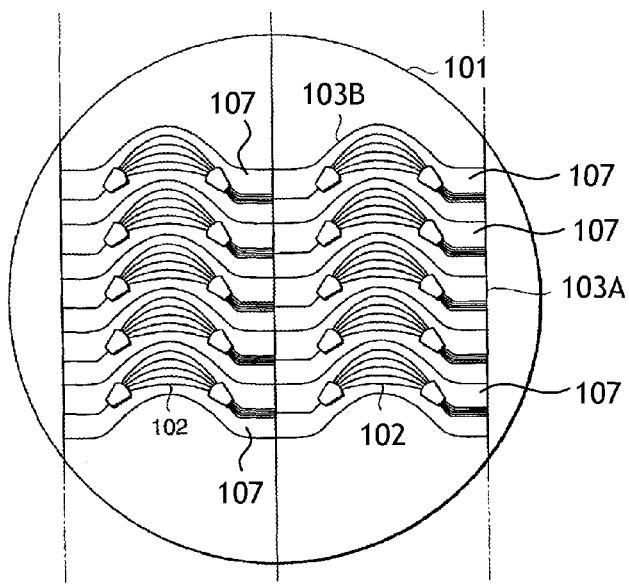
FIG. 1A is a plan view of a prior-art PLC wafer having two columns of stacked arcuate AWG structures separated by straight and arcuate cut lines.
Figure 1B:
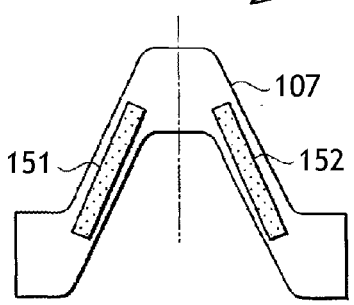
FIG. 1B is a plan view of a prior-art arcuate AWG chip reinforced with a pair of symmetrically disposed straight beams.
Figure 1C:
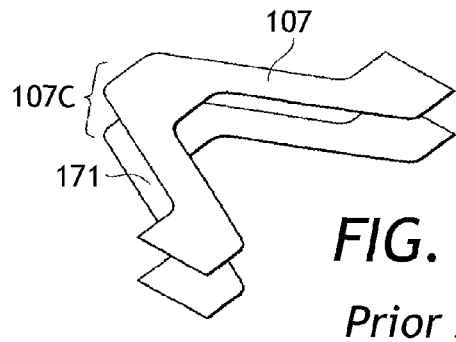
FIG. 1C is an exploded isometric view of a prior-art arcuate AWG chip reinforced with an arcuate silicon substrate.
Figure 2A:
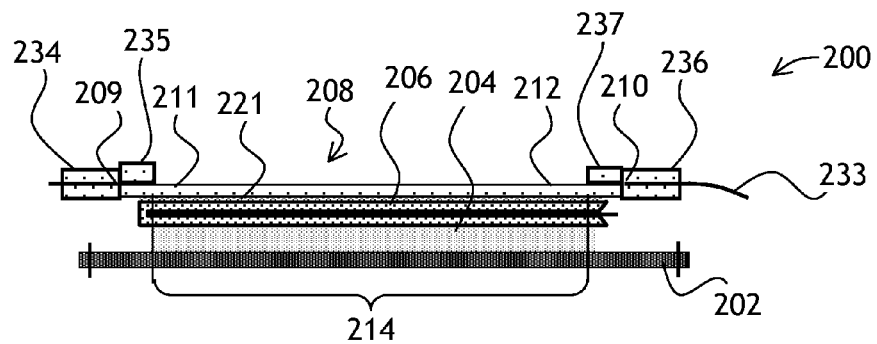
FIGS. 2A and 2B are elevational and plan views, respectively, of a PLC module of the invention.
Figure 2B:
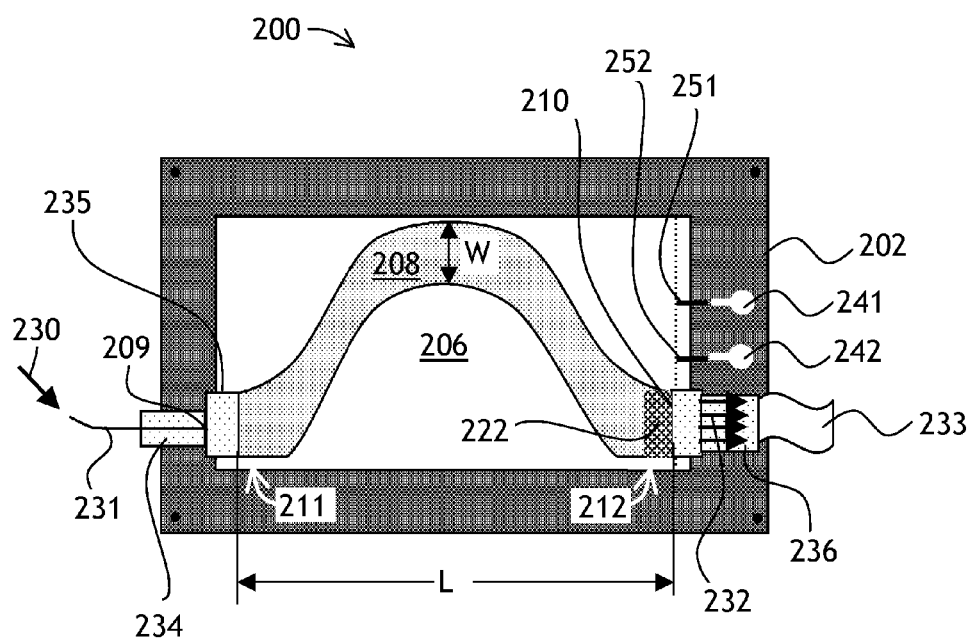

Referring to FIGS. 2A and 2B, a PLC module 200 includes a base plate 202 and a support layer 204 mounted on the base plate 202, a heater plate 206 mounted on the support layer 204, and a PLC 208 having a shape of an arcuate slab best seen in FIG. 2B. The PLC 208 has an input port 209 at its first end 211 and a plurality of output ports 210 at its second, opposed end 212. An input optical fiber 231 (FIG. 2B) can be optically and mechanically coupled to the input port 209 by placing the optical fiber 231 into a ferrule 234, and mechanically connecting the ferrule 234 to an input glass block 235, which is attached e.g. epoxied to the PLC 208 near its first end 211. Similarly, an output optical fiber array 233 can be optically and mechanically coupled to the plurality of output ports 210 by attaching a V-groove block 236 to an output glass block 237, which can be epoxied to the PLC 208 proximate its second end 212.

According to the invention, the support layer 204 has a thickness greater than 1 mm and a hardness less than 40 Shore A. The PLC 208 is adhered to the heater plate 206 over an area 214 spanning between the first 211 and second 212 ends with a first adhesive e.g. epoxy 221 having a hardness less than 85 Shore A. The PLC 208 is adhered to the heater plate 206 proximate the second end 212 with a second adhesive e.g. epoxy 222 having a hardness of greater than 70 Shore D. The second adhesive 222 has a much higher hardness than the first adhesive 221. As a result, any pull stress applied to the output ports 210 at the second end 212 will be transferred to the heater plate 206 without exerting a considerable stress on the PLC 208.

Furthermore, the mechanical stress applied to the second end 212 and transferred to the heater plate 206, will be absorbed by thick and relatively soft support layer 204. The stress transfer facilitates a considerable reduction of stress-induced wavelength shifts. The support layer 204 also serves as a heat insulator, facilitating uniform heating of the arcuate PLC 208.

In a preferred embodiment, the PLC 208 includes an AWG chip, although other chips e.g. splitters, combiners, switches, etc. can be packaged in this way. When a multi-wavelength optical signal 230 is applied to the input optical fiber 231 coupled to the input port 209, the PLC (AWG chip) 208 separates the multi-wavelength optical signal 230 into individual wavelengths 232. The individual wavelengths 232 are output via the respective output ports 210 to individual optical fibers of a fiber array 233. Of course, the notion of "input" and "output" ports of the PLC 208 is merely for convenience, and light can propagate backwards from "output" ports to "input" port(s).

The PLC 208 preferably has a length L between its first 211 and second 212 ends of 50 mm or less, and a width W of 20 mm or less. The thickness of the PLC 208 is preferably at least 0.4 mm.

To facilitate redirection of the mechanical stress away from the PLC 208, the support layer 204 can include a thick and soft plastic or foam material, conveniently a thick and soft double-sided adhesive tape, or a non-adhesive tape or foam sheet coated with a suitable adhesive in a separate manufacturing step. Preferably, the thickness of the support layer 204 is between 1 mm and 4 mm, and more preferably between 1.5 and 2.5 mm. Using the soft first adhesive layer 221, with hardness less than 85 Shore A, absorbs mechanical stress due to a mismatch between the thermal expansion coefficients (TEC) of the PLC 208 and the TEC of the heater plate 206, enabling the use of inexpensive alumina ceramic heater plates. Preferably, the ceramic heater plate 206 includes a resistive heater encapsulated by alumina ceramic material on all sides. Other heaters/heat spreaders can also be used, even non-ceramic, with TEC of less than approximately 15 ppm/° C., and more preferably less than 7 ppm/° C., for PLC 208 made of silicon.

Conveniently, the base plate 202 can include a printed circuit board (PCB) having first 241 and second 242 electrical traces. The heater plate 206 can have first 251 and second 252 contacts, coupled to the first and second electrical traces, respectively, for providing a heating electric current.

Figure 3:
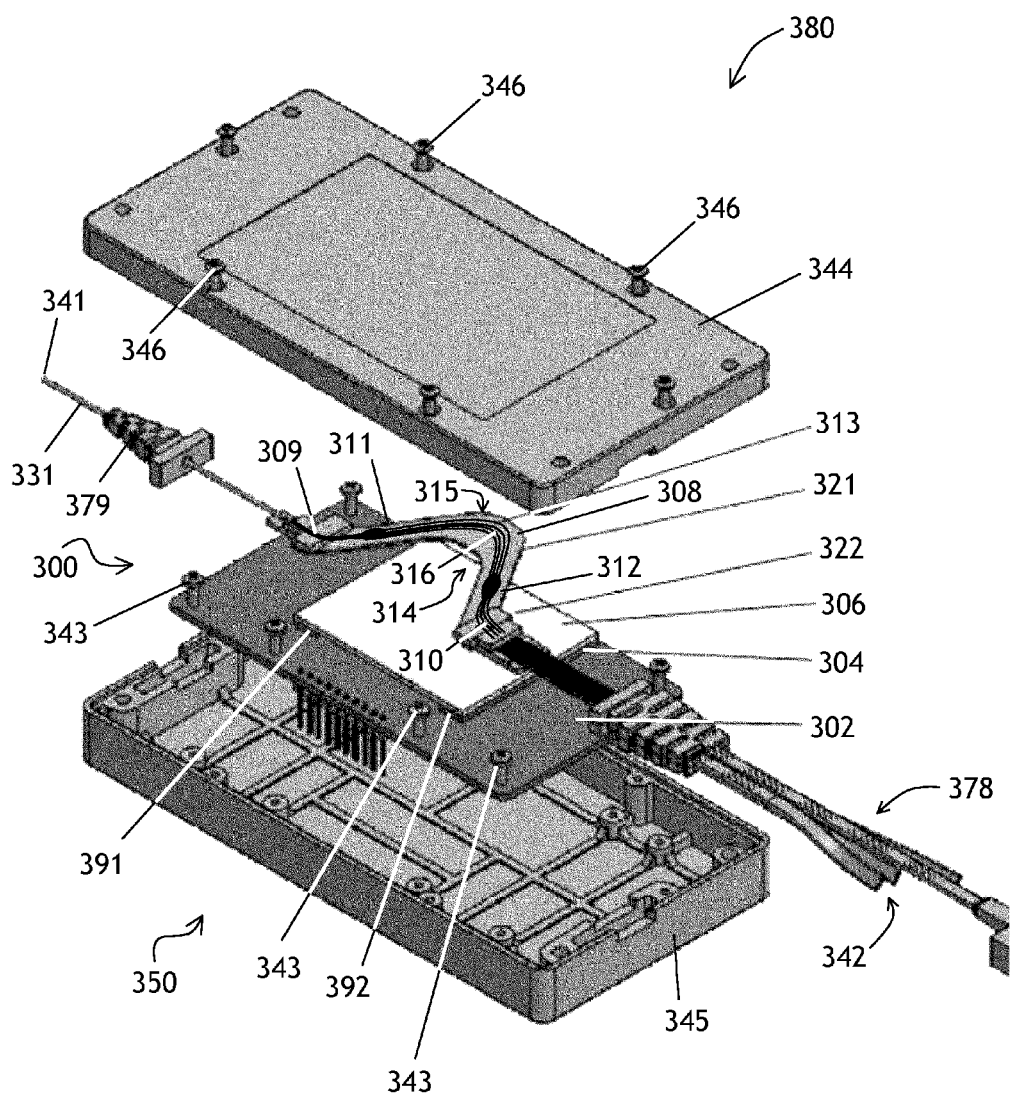
FIG. 3 is an exploded isometric view of a wavelength demultiplexor module of the invention including the PLC module of FIGS. 2A and 2B.

Referring now to FIG. 3, a wavelength demultiplexor module 380 includes an AWG module 300 packaged into an encasing 350. The AWG module 300 is similar to the PLC module 200 of FIGS. 2A and 2B. The AWG module 300 of FIG. 3 includes a base plate 302, an adhesive tape 304 adhered to the base plate 302, a ceramic heater plate 306 adhered to the adhesive tape 304, and an arcuate AWG chip 308 having an input portion 311 including an input waveguide 309, an output portion 312 including a plurality of output waveguides 310, and a central portion 313 between the input 311 and output 312 portions. The central portion 313 has opposed concave 314 and convex 315 perimeter walls. The input 311, central 313, and output 312 portions of the arcuate AWG chip 308 are affixed to the ceramic heater plate 306 with a contiguous soft adhesive layer 321 having a hardness of less than 85 Shore A. The output portion 312 of the arcuate AWG chip 308 is additionally affixed to the ceramic heater plate 306 with a hard adhesive layer 322 having a hardness of at least 70 Shore D. The adhesive tape 304 has a thickness greater than 1 mm and a hardness less than 40 Shore A.

In the embodiment shown in FIG. 3, the central portion 313 of the arcuate AWG chip 308 has an array of waveguides 316 running substantially parallel to each other between the convex 315 and concave 314 walls and throughout the central portion 313. To save valuable wafer space, the central portion 313 can have a width of 20 mm or less, measured in a direction substantially perpendicular to the array of waveguides 316. For convenience of assembly, the adhesive tape 304 can include first 391 and second 392 separate portions disposed under the input 311 and output 312 portions, respectively, of the arcuate AWG chip 308. Similarly to the heater plate 206 of the PLC module 200 of FIGS. 2A and 2B, the heater plate 306 of the AWG module 300 of FIG. 3 can include a resistive element (not shown) encapsulated by alumina ceramic. In the embodiment shown, the base plate 302 includes a printed circuit board.

The wavelength demultiplexor module 380 of FIG. 3 further includes an input port 341 optically coupled to the input waveguide 309 via an input fiber 331 held by a boot 379, a plurality of output ports 342 each coupled to a particular one of the plurality of output waveguides 310 via a fiber ribbon 378. The encasing 350 has the AWG module 308 affixed therein via screws 343 running through the base plate 302. A lid 344 of the encasing 350 is attached to a bottom portion 345 of the encasing 350 by screws 346. Of course, other encasings can be used.

Figure 4:
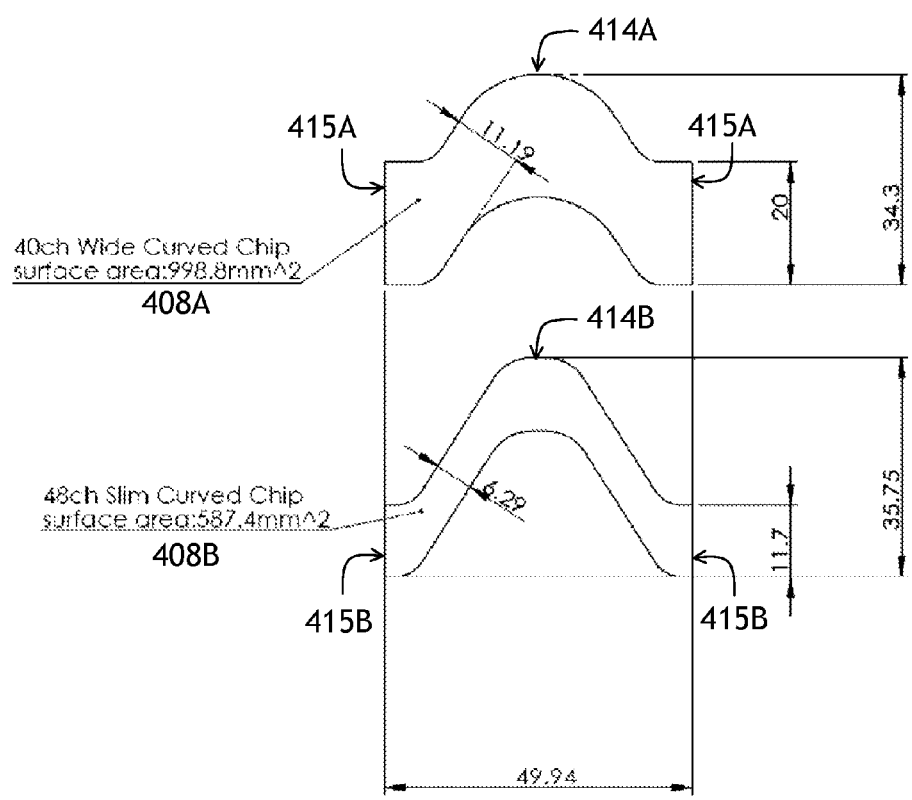
FIG. 4 is a plan-view schematic diagram of arcuate AWG chips of the invention, usable in the PLC module of FIGS. 2A and 2B and in the wavelength demultiplexor of FIG. 3.

Referring to FIG. 4, "wide" and "slim" arcuate AWG chips 408A and 408B, respectively, are usable in the AWG module 300 of FIG. 3 and in the PLC module 200 of FIGS. 2A and 2B. The "wide" arcuate AWG chip 408A accommodates a 40-channel AWG structure (not shown). The width of the "wide" arcuate AWG chip 408A is 11.19 mm at a beginning of an arcuate portion 414A, and 20 mm at bases 415A. The height of the "wide" arcuate AWG chip 408A is 34.3 mm. The surface area of the "wide" arcuate AWG chip 408A is 998.8mm$^2$.

The "slim" arcuate AWG chip 408B accommodates a 48-channel AWG structure (not shown). The width of the "slim" arcuate AWG chip 408B is only 6.29 mm at beginning of an arcuate portion 414B, and 11.7 mm at bases 415B. The height of the "slim" arcuate AWG chip 408B is 35.75 mm. The surface area of the "slim" arcuate AWG chip 408B is 587.4 mm$^2$. The length of both the "wide" arcuate AWG chip 408A and the "slim" arcuate AWG chip 408B is 49.94 mm. Both the "wide" 408A and "slim" 408B arcuate AWG chips have been packaged into PLC modules of FIGS. 2A and 2B and have shown excellent wavelength stability w.r.t. mechanical stress. The "slim" arcuate AWG chip 408B is preferable over the "wide" arcuate AWG chip 408A, because the "slim" arcuate AWG chip 408B has a smaller surface area than the "wide" arcuate AWG chip 408A, and thus is less expensive to produce and quicker to heat.

Figure 5:
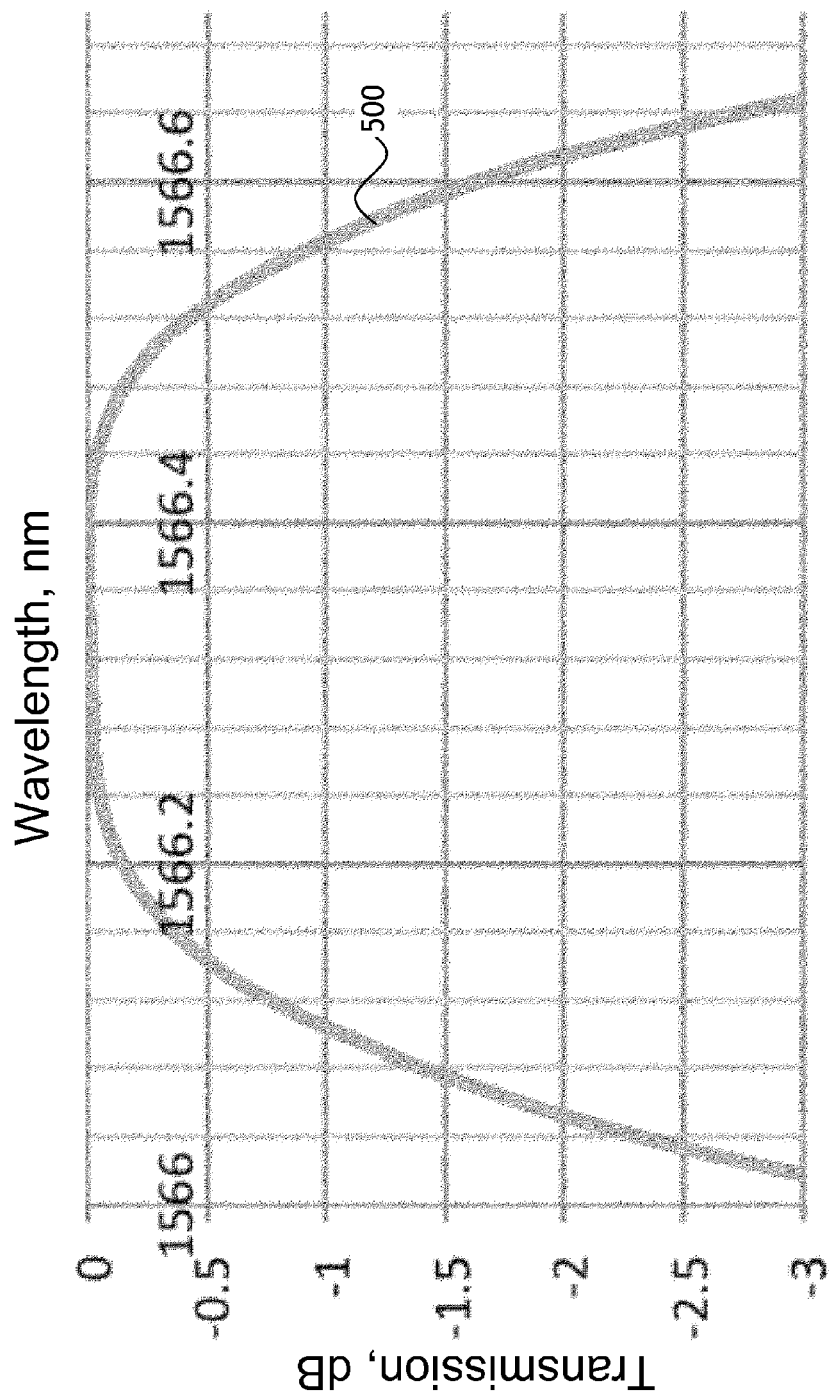
FIG. 5 is a spectral plot of a bandpass of a bottom arcuate chip of FIG. 4 mounted according to FIGS. 2A and 2B and FIG. 3, at various externally induced mechanical stress levels.
Figure 6:
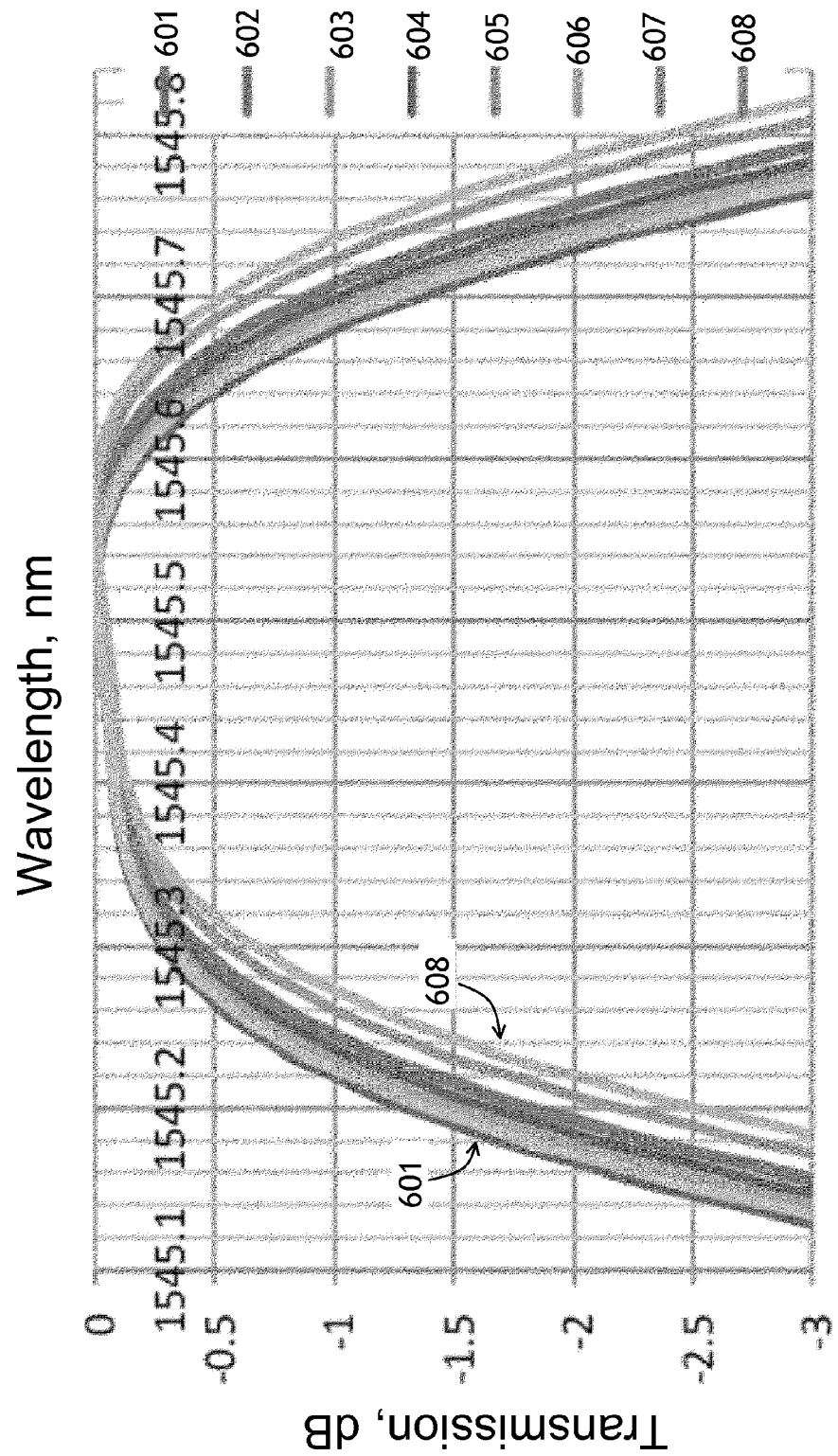
FIG. 6 is a spectral plot of a bandpass of the bottom arcuate chip of FIG. 4 mounted on a heater held by grommets, at the mechanical stress levels of FIG. 5.

Turning to FIG. 5 with further reference to FIG. 4, the position of a spectral band 500 of the "slim" arcuate AWG chip 408B is stable to within 1 pm at the mechanical stress applied according to Telcordia GR-1209 test protocol. By comparison, when the "slim" arcuate AWG chip 408B was mounted via grommets holding the heater plate 206 (FIG. 2A and 2B), and the "slim" arcuate AWG chip 408B was epoxied to the heater plate 206 with an epoxy having a hardness of Shore 85 A, the stress-induced center wavelength variation was well over 40 pm. For instance, referring to FIG. 6, spectra 601 to 608 have the center wavelength varied by approximately 60 pm under the above test protocol conditions.

Figure 7:
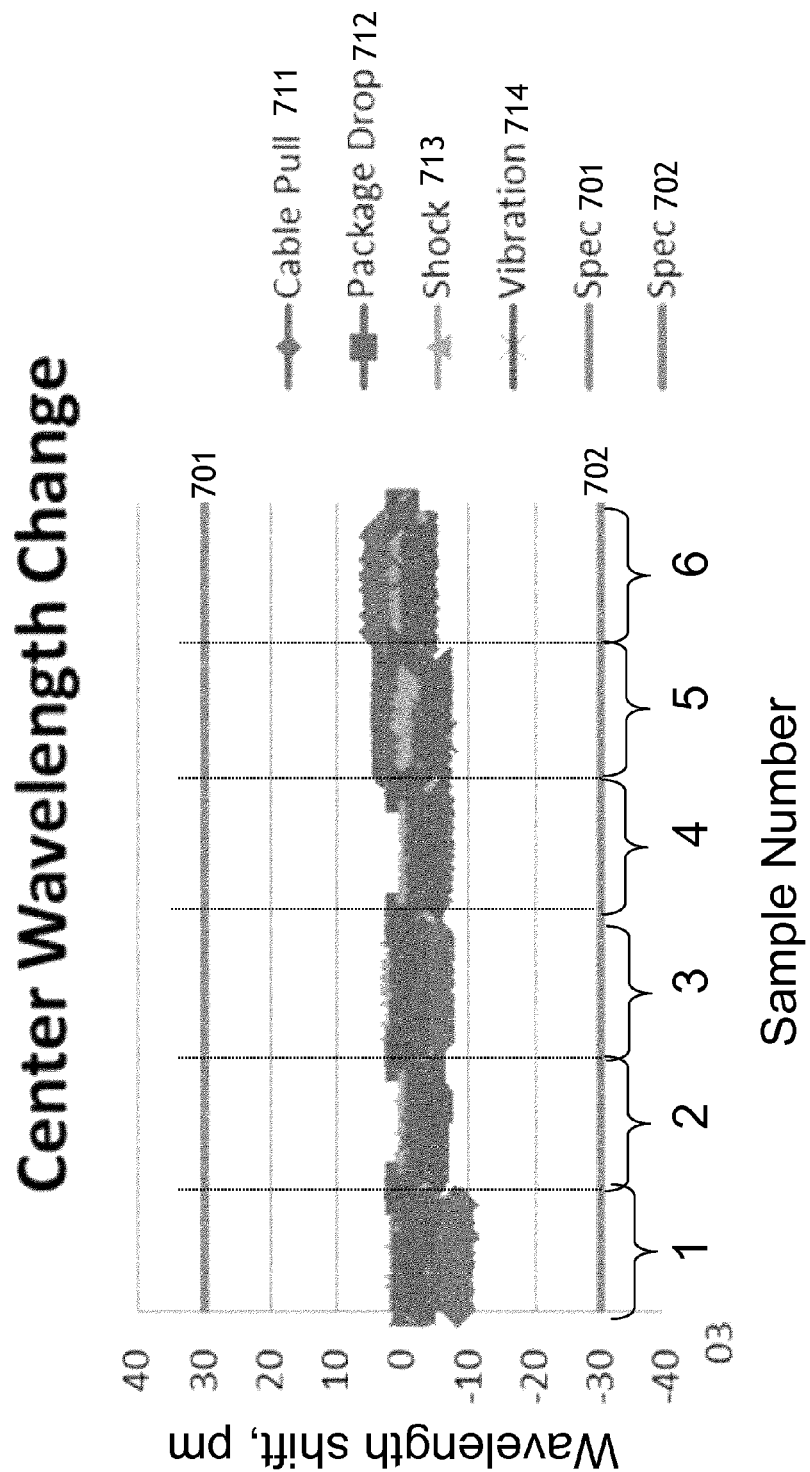
FIG. 7 is a graph showing a wavelength shift due to externally induced mechanical stress for six wavelength demultiplexor module prototypes.

Turning now to FIG. 7, six prototypes of the "slim" arcuate AWG chip 408B "1", "2", "3", "4", "5", and "6", mounted as shown in FIGS. 2A and 2B, have been tested for stress-induced wavelength shift. The stress was applied according to Telcordia GR-1209, GR-1312 and GR-63 test protocols. One can see that the stress due to cable pull 711, package drop 712, shock 713, and vibration 714 was within +−10 pm, which is much better than spec limits 701, 702 of +−30 pm.

Figure 8:
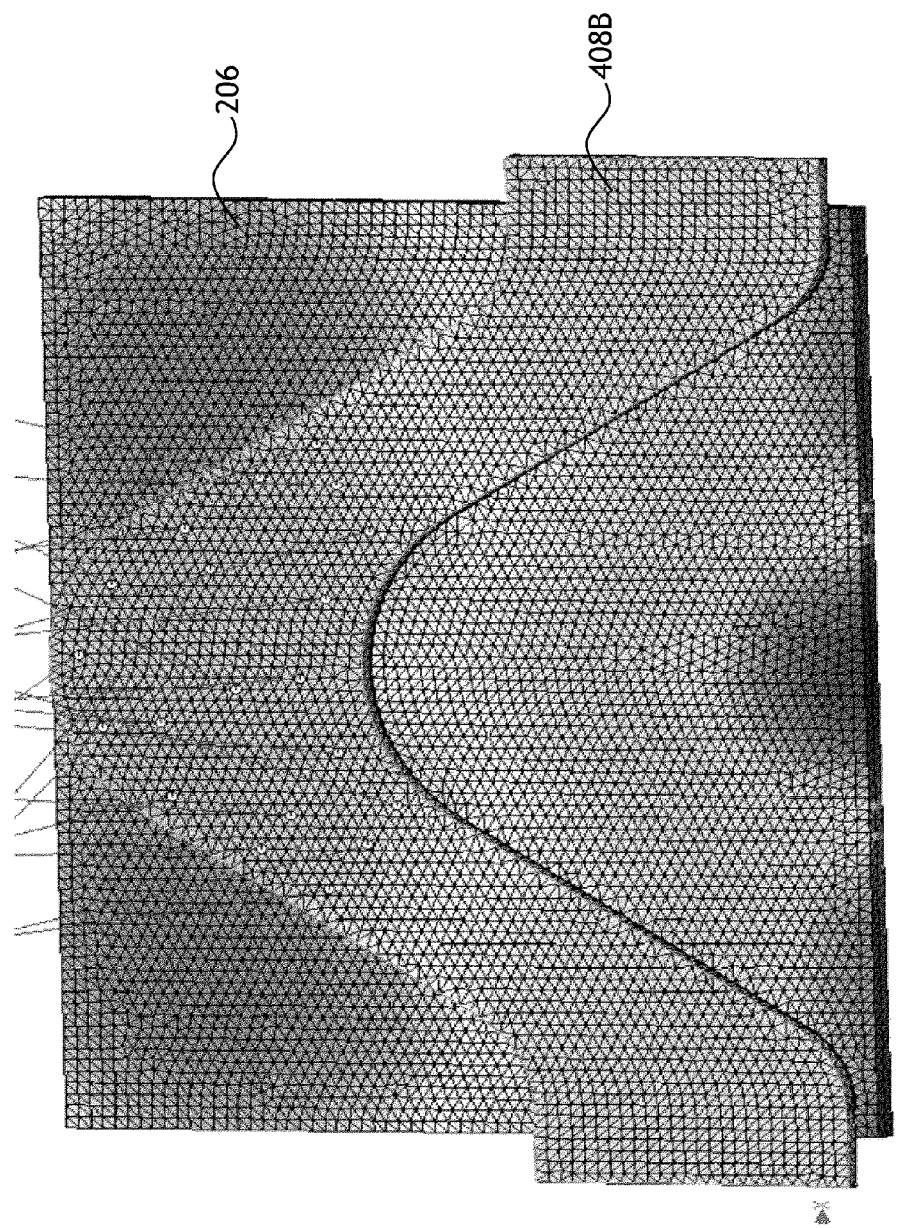
FIG. 8 is a simulated temperature distribution of the bottom arcuate AWG chip of FIG. 4.

Temperature distribution of the heater plate 206 of FIG. 2A has been simulated. Referring to FIG. 8, the maximum temperature variation of the "slim" arcuate AWG chip 408B on the heater plate 206, represented by shades of gray, was within 0.11° C., which corresponds to the wavelength shift of 2 pm. The heater plate 206 was made of alumina ceramic.

Figure 9:
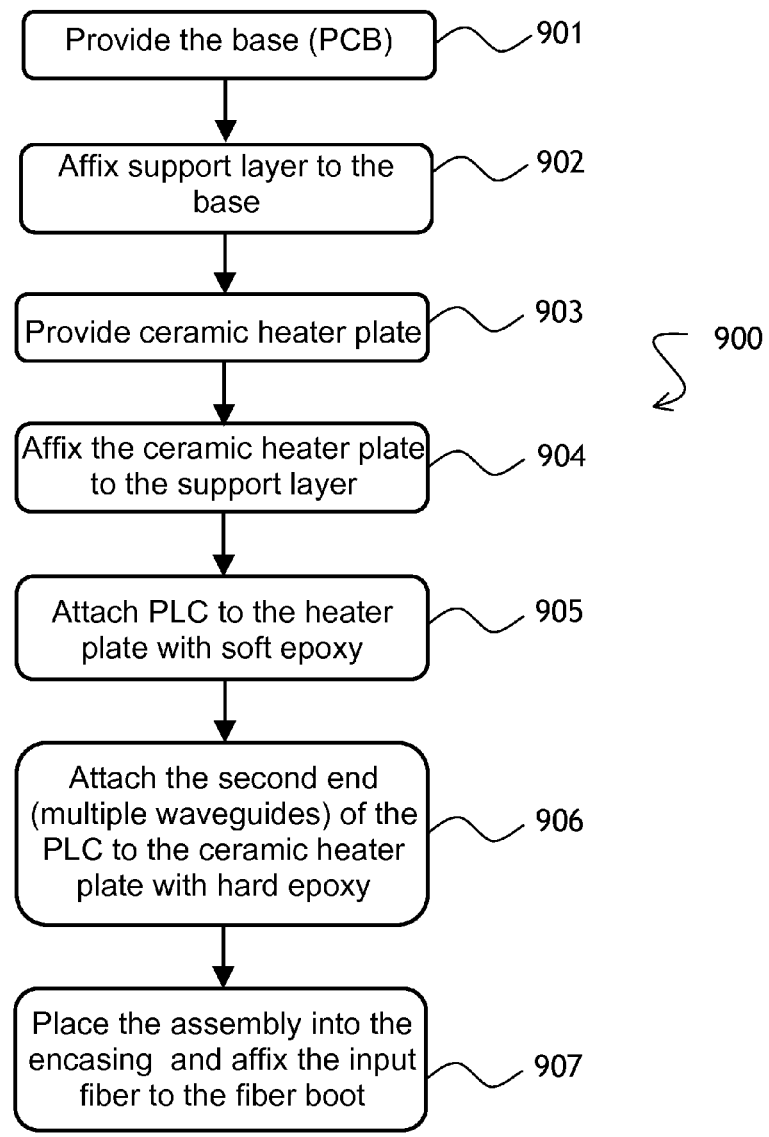
FIG. 9 is a flow chart of manufacturing the PLC module of FIGS. 2A and 2B.

Referring now to FIG. 9 with further reference to FIG. 3, a method 900 of manufacturing a PLC module e.g. the AWG module 300 of FIG. 3 includes a step 901 (FIG. 9) of providing the base 302. In a step 902, the support layer 304 is affixed to the base 302. The support layer 304 has a thickness greater than 1 mm and a hardness of less than 40 Shore A. In a step 903, the ceramic heater plate 306 is provided. Then, in a step 904, the ceramic heater plate 306 is affixed to the support layer 304. The support layer 304 can include the strips 391 and 392 of a thick, soft adhesive tape.

In a following step 905, the arcuate AWG 308 is epoxied to the heater plate 306 over an area spanning between the first and second ends with the soft epoxy layer 321 having a hardness less than 85 Shore A. The soft epoxy allows for some stress relaxation due to thermal mismatch between the heater plate 306 and the arcuate AWG 308. After the soft epoxy layer was applied, the soft epoxy layer 321 is cured e.g. for two hours at an elevated temperature of 110° C.

In a step 906, the second end of the arcuate AWG 308 is epoxied to the ceramic heater plate 306 with a hard epoxy 322 having a hardness of greater than 70 Shore D. This step is preferably performed after the assembly is removed from the oven after the soft epoxying step 905, to avoid shifts or turns of the arcuate AWG 308 upon local application and curing the hard epoxy.

Figure 10:
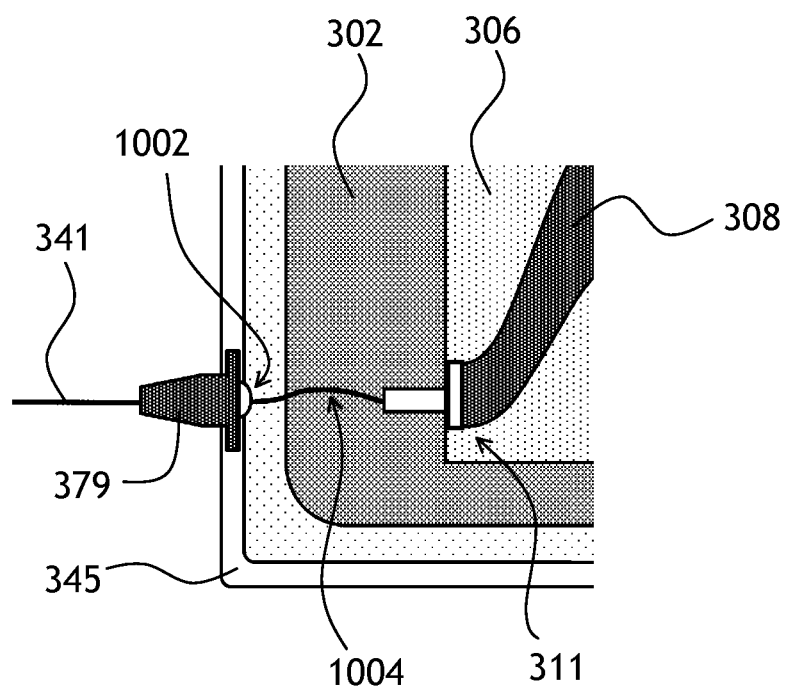
FIG. 10 is a partial plan view of an input fiber portion of the wavelength demultiplexor module of FIG. 3.

Referring now to FIG. 10 with further reference to FIGS. 3 and 9, the assembled AWG module 300 and the fiber boot 379 can be placed into the bottom portion 345 of the encasing 350 in a step 907. The input fiber 341 is then affixed to the fiber boot 379 with a soft epoxy or silicon rubber 1002. The length of the input fiber 341 between the fiber boot 379 and the arcuate AWG chip 308 is selected so that when the AWG module 300 is placed into the bottom portion 345 of the encasing 350 and the soft epoxy or silicon rubber 1002 is applied to fix the input fiber 341, the latter has a slight bend 1004, e.g. with a bend radius of less than 50 cm. The bend 1004 is provided for stress relieving purposes, and/or to provide a room for mechanical tolerances. Of course, not only the arcuate AWG 308, but other types of arcuate PLC can be packaged using the method 900 of FIG. 9.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A PLC module comprising:
a base plate;
a support layer on the base plate, the support layer having a thickness greater than 1 mm and a hardness of less than 40 Shore A;
a heater plate on the support layer; and
a planar lightwave circuit having a shape of an arcuate slab having an input port at a first end thereof and a plurality of output ports at a second opposed end thereof,
wherein the planar lightwave circuit is adhered to the heater plate over an area spanning between the first and second ends with a first adhesive having a hardness less than 85 Shore A, and wherein the planar lightwave circuit is adhered to the heater plate proximate the second end with a second adhesive having a hardness of greater than 70 Shore D.

2. The PLC module of claim 1, wherein the planar lightwave circuit comprises an arrayed waveguide grating.

3. The PLC module of claim 2, wherein the support layer has a thickness of less than 4 mm.

4. The PLC module of claim 3, wherein the support layer has a thickness of between 1.5 mm and 2.5 mm.

5. The PLC module of claim 1, wherein the heater plate comprises a resistive heater encapsulated by a ceramic material having a thermal expansion coefficient of less than 15 ppm/° C.

6. The PLC module of claim 1, wherein the heater plate comprises alumina ceramic.

7. The PLC module of claim 6, wherein the arcuate slab has a length between the first and second ends thereof of 50 mm or less.

8. The PLC module of claim 7, wherein arcuate slab has a width of 20 mm or less, and a thickness of at least 0.4 mm.

9. The PLC module of claim 8, wherein the planar lightwave circuit comprises silicon.

10. The PLC module of claim 9, wherein the base plate comprises a printed circuit board.

11. The PLC module of claim 10, wherein the printed circuit board has first and second electrical traces, and wherein the heater plate has first and second contacts for providing a heating electric current, coupled to the first and second electrical traces, respectively.

12. The PLC module of claim 11, wherein the support layer comprises an adhesive tape having first and second separate portions disposed under the first and second ends of the planar lightwave circuit, respectively.

13. An arrayed waveguide grating module comprising:
a base plate;
an adhesive tape having a thickness greater than 1 mm and a hardness less than 40 Shore A, adhered to the base plate;
a ceramic heater plate adhered to the adhesive tape; and
an arcuate arrayed waveguide chip having an input portion including an input waveguide, an output portion including a plurality of output waveguides, and a central portion therebetween having opposed concave and convex perimeter walls, wherein the input, central, and output portions of the arcuate arrayed waveguide chip are affixed to the ceramic heater plate with a contiguous adhesive layer having a hardness less than 85 Shore A; and
wherein the output portion of the arcuate arrayed waveguide chip is affixed to the ceramic heater plate with an adhesive having a hardness of at least 70 Shore D.

14. The arrayed waveguide grating module of claim 13, wherein the central portion of the arcuate arrayed waveguide chip has an array of waveguides running substantially parallel to each other between the convex and concave walls and throughout the central portion, wherein the central portion has a width in a direction substantially perpendicular to the array of waveguides, wherein the width is 20 mm or less.

15. The arrayed waveguide grating module of claim 14, wherein the adhesive tape comprises first and second separate portions disposed under the input and output portions, respectively, of the arcuate arrayed waveguide chip.

16. The arrayed waveguide grating module of claim 15, wherein the ceramic heater plate comprises a resistive element encapsulated by alumina ceramic.

17. A wavelength demultiplexor for demultiplexing a light signal into individual wavelengths, comprising:
- the arrayed waveguide grating module of claim 13;
- an input port coupled to the input waveguide;
- a plurality of output ports each coupled to a particular one of the plurality of output waveguides; and
- an encasing having the arrayed waveguide grating module affixed therein.

18. A method of packaging a planar lightwave circuit, the method comprising:
- (a) providing a base plate;
- (b) affixing to the base plate a support layer having a thickness greater than 1 mm and a hardness of less than 40 Shore A;
- (c) providing a ceramic heater plate;
- (d) affixing the ceramic heater plate to the support layer;
- (e) epoxying to the ceramic heater plate a planar lightwave circuit having a shape of an arcuate slab having an input waveguide at a first end thereof and a plurality of output waveguides at a second opposed end thereof, over an area spanning between the first and second ends with a first epoxy having a hardness less than 85 Shore A; and
- (f) epoxying the second end of the planar lightwave circuit to the ceramic heater plate with a second epoxy having a hardness of greater than 70 Shore D.

19. The method of claim 18, wherein the planar lightwave circuit has an input optical fiber optically coupled to the input waveguide, the method further comprising
- (g) providing an encasing for the planar lightwave circuit and a stress relieving fiber boot;
- (h) placing the stress relieving fiber boot on the optical fiber, and placing the planar lightwave circuit and the stress relieving fiber boot in the encasing, so that the input optical fiber has a bend at a radius of less than 50 cm between the stress relieving fiber boot and the planar lightwave circuit; and
- (i) affixing the stress relieving fiber boot to the input optical fiber.

20. The method of claim 18, wherein step (f) is performed after step (e).

* * * * *